(12) United States Patent
Noguchi et al.

(10) Patent No.: US 11,472,400 B2
(45) Date of Patent: Oct. 18, 2022

(54) VEHICLE CONTROL DEVICE, VEHICLE MANAGEMENT DEVICE, VEHICLE CONTROL METHOD, AND STORAGE MEDIUM

(71) Applicant: HONDA MOTOR CO., LTD., Tokyo (JP)

(72) Inventors: Junpei Noguchi, Wako (JP); Chie Sugihara, Tokyo (JP); Yuta Takada, Tokyo (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 16/871,075

(22) Filed: May 11, 2020

(65) Prior Publication Data

US 2020/0361451 A1 Nov. 19, 2020

(30) Foreign Application Priority Data

May 13, 2019 (JP) .............................. JP2019-090832

(51) Int. Cl.
*B60W 30/06* (2006.01)
*B60W 60/00* (2020.01)
*G08G 1/14* (2006.01)
*B62D 15/02* (2006.01)

(52) U.S. Cl.
CPC ........ *B60W 30/06* (2013.01); *B60W 60/0025* (2020.02); *G08G 1/143* (2013.01); *G08G 1/145* (2013.01); *B62D 15/0285* (2013.01)

(58) Field of Classification Search
CPC .. B60W 30/06; B60W 60/0025; G08G 1/145; G08G 1/143; B62D 15/0285
See application file for complete search history.

(56) References Cited

U.S. PATENT DOCUMENTS

2006/0287826 A1* 12/2006 Shimizu ............... B60Q 1/0023
701/431
2011/0057814 A1* 3/2011 Park ...................... B60W 10/20
340/932.2

(Continued)

FOREIGN PATENT DOCUMENTS

JP 2001-283381 10/2001
JP 2004-209996 7/2004

(Continued)

OTHER PUBLICATIONS

Japanese Office Action for Japanese Patent Application No. 2019-090832 dated May 31, 2022.

*Primary Examiner* — Dale W Hilgendorf
(74) *Attorney, Agent, or Firm* — Amin, Turocy & Watson, LLP

(57) ABSTRACT

A vehicle control device is a vehicle control device mountable in a vehicle and including an acquirer configured to acquire positional information of a frame line of a second parking frame from other vehicle stopped at the second parking frame adjacent to a first parking frame at which the vehicle automatically parks, and a calculator configured to calculate a position of a frame line of the first parking frame on the basis of the positional information of the frame line of the second parking frame acquired by the acquirer.

12 Claims, 10 Drawing Sheets

(56) References Cited

U.S. PATENT DOCUMENTS

| | | | |
|---|---|---|---|
| 2011/0093168 A1* | 4/2011 | Barth | G08G 1/14 |
| | | | 701/41 |
| 2012/0200430 A1* | 8/2012 | Spahl | G08G 1/143 |
| | | | 340/932.2 |
| 2014/0368636 A1* | 12/2014 | Lee | B62D 15/0285 |
| | | | 348/118 |
| 2015/0179075 A1* | 6/2015 | Lee | G08G 1/165 |
| | | | 340/932.2 |
| 2016/0110619 A1* | 4/2016 | Kim | B60W 30/06 |
| | | | 382/104 |
| 2017/0032674 A1* | 2/2017 | Baasch | G08G 1/143 |
| 2017/0154530 A1* | 6/2017 | Irion | G08G 1/09623 |
| 2017/0267233 A1* | 9/2017 | Minster | B62D 15/02 |
| 2018/0099661 A1* | 4/2018 | Bae | G08G 1/143 |
| 2018/0307919 A1* | 10/2018 | Hayakawa | G06T 7/60 |
| 2018/0334164 A1* | 11/2018 | Stefan | G06V 20/584 |
| 2020/0298835 A1* | 9/2020 | Suzuki | G05D 1/0044 |

FOREIGN PATENT DOCUMENTS

| | | |
|---|---|---|
| JP | 2005-153568 | 6/2005 |
| JP | 2005-228002 | 8/2005 |
| JP | 2009-139983 | 6/2009 |

\* cited by examiner

FIG. 8

| PARKING SPACE | FRONT MARGIN DISTANCE Df (cm) | RIGHT MARGIN DISTANCE Dr (cm) | LEFT MARGIN DISTANCE Dl (cm) | BACK MARGIN DISTANCE Db (cm) |
|---|---|---|---|---|
| **** | 35 | 32 | 30 | 40 |

MD

VEHICLE CONTROL DEVICE, VEHICLE MANAGEMENT DEVICE, VEHICLE CONTROL METHOD, AND STORAGE MEDIUM

CROSS-REFERENCE TO RELATED APPLICATION

Priority is claimed on Japanese Patent Application No. 2019-090832, filed May 13, 2019, the content of which is incorporated herein by reference.

BACKGROUND

Field of the Invention

The present invention relates to a vehicle control device, a vehicle management device, a vehicle control method, and a storage medium.

Description of Related Art

In recent years, research on automatic control of vehicles has been conducted. In automatic valet parking using this technology, a vehicle that performs automatic parking receives information on the availability of a parking frame from a parking lot management device and moves to the parking frame on the basis of the information. The vehicle having reached the vicinity of the parking frame recognizes a frame line (for example, a white line) of the parking frame using a sensor installed in the vehicle, and parks inside the recognized frame line.

An inter-vehicle communication system that captures a surrounding image of a host vehicle, detects traveling-related information including at least one of traffic conditions and abnormal events around the host vehicle on the basis of the captured surrounding image, and wirelessly transmits the information to other vehicles for the purpose of driving assistance of a vehicle is known (for example, refer to Japanese Unexamined Patent Application, First Publication No. 2001-283381).

SUMMARY

However, in the automatic valet parking as described above, when the brightness in the vicinity of a parking frame is not sufficient due to the effects of a time period (for example, after sunset), bad weather, or the like, the sensor installed in a vehicle may not be able to recognize a frame line of the parking frame in some cases. In addition, the sensor may not be able to recognize the frame line of the parking frame due to the effects of backlighting or the like.

The present invention has been made in view of such circumstances, and an object thereof is to provide a vehicle control device, a vehicle management device, a vehicle control method, and a storage medium which can perform accurate parking control even when a parking frame cannot be recognized in automatic parking processing of automatic valet parking.

A vehicle control device, a vehicle management device, a vehicle control method, and a storage medium according to the present invention have adopted the following configuration.

(1): A vehicle control device according to one aspect of the present invention is a vehicle control device which is mountable in a vehicle and includes an acquirer configured to acquire positional information of a frame line of a second parking frame from other vehicle stopped at the second parking frame adjacent to a first parking frame at which the vehicle automatically parks, and a calculator configured to calculate a position of a frame line of the first parking frame on the basis of the positional information of the frame line of the second parking frame acquired by the acquirer.

(2): In the aspect of (1) described above, the vehicle control device further includes a first recognizer configured to recognize the frame line of the first parking frame, and a first requester configured to transmit a request for requesting the positional information of the frame line of the second parking frame to the other vehicle in a case where the frame line of the first parking frame is not recognized by the first recognizer.

(3): In the aspect of (2) described above, the acquirer is configured to acquire the positional information of the frame line of the second parking frame measured by a sensor of the other vehicle activated on the basis of the request.

(4): In the aspect of any one of (1) to (3) described above, the vehicle control device further includes a second recognizer configured to recognize a position of the other vehicle, in which the acquirer is configured to acquire information indicating a distance between the other vehicle and the frame line of the second parking frame from the other vehicle, and the calculator is configured to calculate a position of the frame line of the first parking frame on the basis of the position of the other vehicle recognized by the second recognizer and information indicating a distance between the other vehicle and the frame line of the second parking frame, which is acquired by the acquirer.

(5): In the aspect of (4) described above, the calculator is configured to calculate the position of the frame line of the first parking frame by subtracting the distance between the other vehicle and the frame line of the second parking frame, which is acquired by the acquirer, from a distance between a position of the vehicle and the position of the other vehicle recognized by the second recognizer.

(6): In the aspect of any one of (1) to (5) described above, the acquirer is configured to acquire positional information of the frame line of the first parking frame calculated on the basis of the positional information of the frame line of the second parking frame from the other vehicle.

(7): In the aspect of any one of (1) to (6) described above, the vehicle control device further includes a second requester configured to transmit a request for requesting an operation of a light illuminating a lower portion of the other vehicle to the other vehicle.

(8): In the aspect of any one of (1) to (7) described above, there is at least one another parking frame between the first parking frame and the second parking frame.

(9): In the aspect of any one of (1) to (8) described above, the vehicle control device further includes a controller configured to control automatic parking of the vehicle at the first parking frame on the basis of the position of the frame line of the first parking frame calculated by the calculator.

(10): In the aspect of (2) or (3) described above, the vehicle control device further includes a controller configured to control the automatic parking of the vehicle at the first parking frame on the basis of the position of the frame line of the first parking frame calculated by the calculator, in which the controller is configured to change a parking frame at which the vehicle performs automatic parking in a case where the frame line of the first parking frame is not recognized by the first recognizer and the positional information of the frame line of the second parking frame is not acquired from the other vehicle by the acquirer.

(11): In the aspect of (2) or (3) described above, the vehicle control device further includes a controller configured to control the automatic parking of the vehicle at the first parking frame on the basis of the position of the frame line of the first parking frame calculated by the calculator, in which the controller is configured to control the automatic parking to make a center position in a vehicle width direction of the vehicle and a center position in a width direction of the first parking frame overlap each other in a case where the frame line of the first parking frame is not recognized by the first recognizer and the positional information of the frame line of the second parking frame is not acquired from the other vehicle by the acquirer.

(12): A vehicle management device according to another aspect of the present invention is a vehicle management device that selects a vehicle to be guided to a first parking frame on the basis of positional information of a frame line of a second parking frame transmitted by the vehicle control device according to the aspect of any one of (1) to (11) described above.

(13): A vehicle control method according to still another aspect of the present invention is a vehicle control method that includes, by a computer of a vehicle control device mountable in a vehicle, acquiring positional information of a frame line of a second parking frame from other vehicle stopped at the second parking frame adjacent to a first parking frame at which the vehicle automatically parks, and calculating a position of a frame line of the first parking frame on the basis of the acquired positional information of the frame line of the second parking frame.

(14): A computer-readable non-transitory storage medium according to still another aspect of the present invention is a storage medium that stores a program causing a computer of a vehicle control device mountable in a vehicle to acquire positional information of a frame line of a second parking frame from other vehicle stopped at the second parking frame adjacent to a first parking frame at which the vehicle automatically parks, and to calculate a position of a frame line of the first parking frame on the basis of the acquired positional information of the frame line of the second parking frame.

According to the aspects of (1) to (7), (9) to (11), (13), and (14), it is possible to perform accurate parking control even when a parking frame cannot be recognized in automatic parking processing of automatic valet parking.

According to the aspect of (8), it is possible to recognize a parking frame by increasing brightness in the vicinity of the parking frame.

According to the aspect of (12), it is possible to ascertain a parking available space of a parking frame on a vehicle control device side, and to optimize guidance control of a vehicle in automatic parking.

BRIEF DESCRIPTION OF THE DRAWINGS

FIG. 8 is a diagram which shows an example of the frame line information according to the embodiment.

DETAILED DESCRIPTION OF THE INVENTION

Hereinafter, embodiments of a vehicle control device, a vehicle management device, a vehicle control method, and a storage medium of the present invention will be described with reference to the drawings.

EMBODIMENT

[Overall Configuration]

Figure 1:
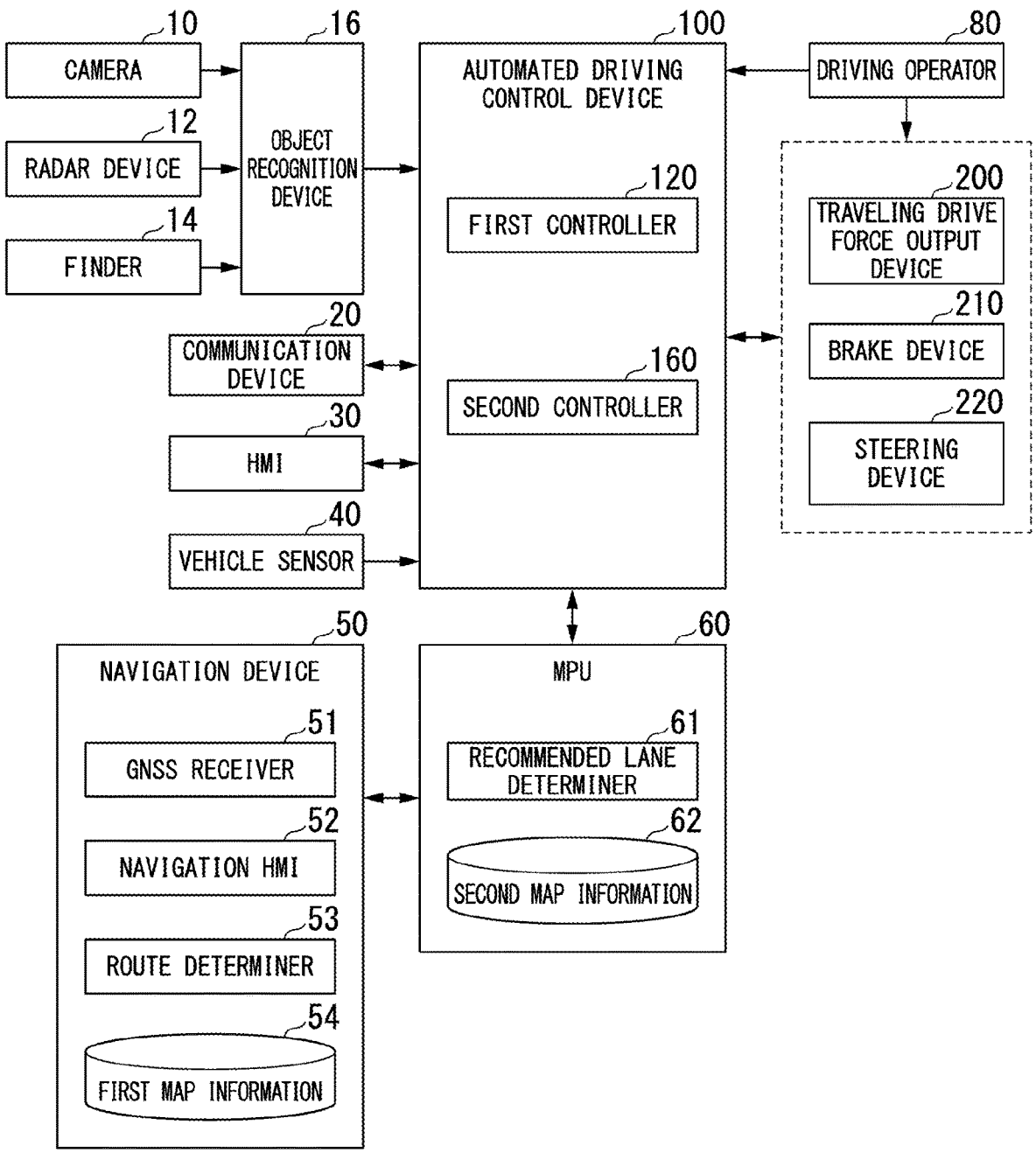
FIG. 1 is a configuration diagram of a vehicle system using a vehicle control device according to an embodiment.

FIG. 1 is a configuration diagram of a vehicle system 1 using a vehicle control device according to an embodiment. A vehicle on which the vehicle system 1 is mounted is, for example, two-wheel, three-wheel, or four-wheel vehicle, and a driving source thereof is an internal combustion engine such as a diesel engine or a gasoline engine, an electric motor, or a combination thereof. The electric motor operates using electric power generated by a generator connected to the internal combustion engine, or electric power discharged from a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100 (an example of the "vehicle control device"), a traveling drive force output device 200, a brake device 210, and a steering device 220. These devices or apparatuses are connected to each other by a multiplex communication line such as a controller area network (CAN) communication line, a serial communication line, a wireless communication network, or the like. The configuration shown in FIG. 1 is merely an example, and part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to an arbitrary position of a vehicle on which the vehicle system 1 is mounted. When the front is imaged, the camera 10 is attached to an upper part of the front windshield, a back of the rearview mirror, or the like. The camera 10 periodically images a vicinity of the host vehicle M. The camera 10 may also be a stereo camera.

The radar device 12 radiates radio waves such as millimeter waves to the vicinity of the host vehicle M, and detects at least a position (a distance and an orientation) of an object by detecting radio waves (reflected waves) reflected by the object. The radar device 12 is attached to an arbitrary position of the host vehicle M. The radar device 12 may detect the position and a speed of the object using a frequency modulated continuous wave (FM-CW) method.

The finder 14 is a light detection and ranging (LIDAR). The finder 14 radiates light to the vicinity of the host vehicle M and measures scattered light. The finder 14 detects a distance to the object on the basis of time from light emission to light reception. The radiated light is, for example, pulsed laser light. The finder 14 is attached to an arbitrary position of the host vehicle M.

The object recognition device 16 performs sensor fusion processing on a result of detection performed by some or all of the camera 10, the radar device 12, and the finder 14, and recognizes the position, type, speed, and the like of the object. The object recognition device 16 outputs a result of the recognition to the automated driving control device 100. The object recognition device 16 may output the results of detection by the camera 10, the radar device 12, and the finder 14 to the automated driving control device 100 as they are. The object recognition device 16 may be omitted from the vehicle system 1.

The communication device 20 uses, for example, a cellular network, a Wi-Fi network, a Bluetooth (a registered trademark), a dedicated short range communication (DSRC), or the like, and communicates with other vehicle or a parking lot management device present in the vicinity of the host vehicle M or various types of server devices. Details of functions of the parking lot management device will be described below.

The HMI 30 presents various types of information to an occupant of the host vehicle M and receives an input operation from the occupant. The HMI 30 includes various display devices, speakers, buzzers, touch panels, switches, keys, and the like.

The vehicle sensor 40 includes a vehicle speed sensor that detects the speed of the host vehicle M, an acceleration sensor that detects the acceleration, a yaw rate sensor that detects an angular speed around a vertical axis, an orientation sensor that detects a direction of the host vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or supplemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route (hereinafter, a route on a map) from the position (or an arbitrary input position) of the host vehicle M identified by the GNSS receiver 51 to a destination input from the occupant using the navigation HMI 52 with reference to the first map information 54. The first map information 54 is, for example, information in which a road shape is expressed by a link indicating a road and a node connected by the link. The first map information 54 may include curvature of a road, point of interest (POI) information, and the like. The route on a map is output to the MPU 60. The navigation device 50 may perform route guidance using the navigation HMI 52 on the basis of the route on a map. The navigation device 50 may be realized by, for example, a function of a terminal device such as a smart phone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determiner 61, and holds second map information 62 in the storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. The recommended lane determiner 61 determines which numbered lane to travel from the left. When there is a branch point in the route on a map, the recommended lane determiner 61 determines a recommended lane such that the host vehicle M can travel in a reasonable route for traveling to a branch destination.

The second map information 62 is map information with higher accuracy than the first map information 54. The second map information 62 includes, for example, information on a center of a lane or information on a boundary of the lane. The second map information 62 may include road information, traffic regulation information, address information (addresses/postal codes), facility information, telephone number information, and the like. The second map information 62 may be updated at any time by the communication device 20 communicating with another device.

The driving operator 80 includes, for example, an accelerator pedal, a brake pedal, a shift lever, a steering wheel, a modified steer, a joystick, and other operators. A sensor that detects an operation amount or a presence or absence of an operation is attached to the driving operator 80, and this detection result is output to the automated driving control device 100 or some or all of the traveling drive force output device 200, the brake device 210, and the steering device 220.

The automated driving control device 100 includes, for example, a first controller 120 and a second controller 160. Each of the first controller 120 and the second controller 160 is realized by, for example, a hardware processor such as a central processing unit (CPU) executing a program (software). Some or all of these components may be realized by hardware (a circuit; including circuitry) such as a large scale integration (LSI), an application specific integrated circuit (ASIC), a field-programmable gate array (FPGA), or a graphics processing unit (GPU) and may also be realized by a cooperation of software and hardware. The program may be stored in advance in a storage device (a storage device including a non-transitory storage medium) such as an HDD or a flash memory of the automated driving control device 100, or may be stored in a detachable storage medium such as a DVD or a CD-ROM and installed in the HDD or the flash memory of the automated driving control device 100 by the storage medium (the non-transitory storage medium) being mounted on a drive device.

Figure 2:
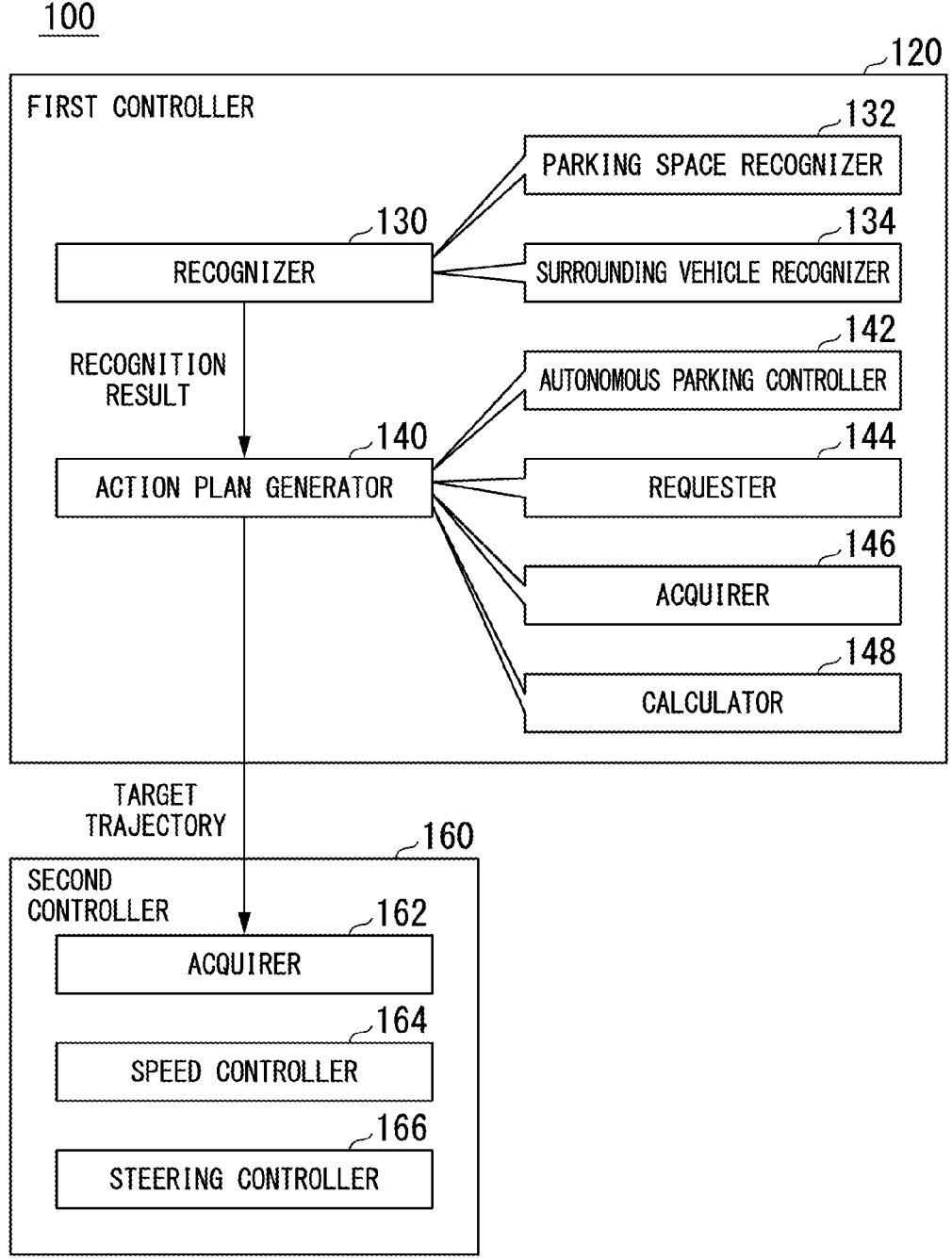
FIG. 2 is a functional configuration diagram of a first controller and a second controller according to the embodiment.

FIG. 2 is a functional configuration diagram of the first controller 120 and the second controller 160 according to the embodiment. The first controller 120 includes, for example, a recognizer 130 and an action plan generator 140. The first controller 120 realizes, for example, a function based on artificial intelligence (AI) and a function based on a model given in advance in parallel. For example, a function of "recognizing an intersection" may be realized by executing a recognition of an intersection by deep learning or the like and a recognition based on conditions (including signals whose patterns can be matched, road markings, and the like) given in advance in parallel and comprehensively evaluating the both by scoring them. As a result, a reliability of automated driving is guaranteed.

The recognizer 130 recognizes situations such as the position, speed and acceleration of an object in the vicinity of the host vehicle M on the basis of information to be input from the camera 10, the radar device 12, and the finder 14 via the object recognition device 16. The position of the object is, for example, recognized as a position on absolute coordinates having the origin at a representative point (a center of gravity, a center of a drive axis, or the like) of the host vehicle M, and is used for control. The position of the object may be represented by a representative point such as a center of gravity or a corner of the object, or may be represented by an expressed area. A "state" of the object may include the acceleration or jerk of the object, or an "action state" (for example, whether a lane is being changed or is intended to be changed).

The recognizer 130 recognizes, for example, a lane (traveling lane) in which the host vehicle M is traveling. For example, the recognizer 130 recognizes a traveling lane by comparing a pattern (for example, an array of solid lines and dashed lines) of a road section line obtained from the second map information 62 with a pattern of a road section line in the vicinity of the host vehicle M recognized from an image captured by the camera 10. The recognizer 130 may recognize a traveling lane by recognizing not only a road section line but also a traveling road boundary (road boundary) including road section lines, road shoulders, curbs, median strips, guardrails, and the like. In this recognition, the position of the host vehicle M acquired from the navigation device 50 and a result of processing performed by the INS may be added. The recognizer 130 recognizes temporary stop lines, obstacles, red lights, tollgates, or other road events.

When a traveling lane is recognized, the recognizer 130 recognizes the position and posture of the host vehicle M with respect to the traveling lane. The recognizer 130 may recognize, for example, a deviation of a reference point of the host vehicle M from a lane center and an angle of a traveling direction of the host vehicle M formed with respect to a line connecting the lane centers as the relative position and posture of the host vehicle M with respect to the traveling lane. Instead, the recognizer 130 may recognize a position and the like of the reference point of the host vehicle M with respect to either side end (a road section line or a road boundary) of the traveling lane as a relative position of the host vehicle M with respect to the traveling lane.

The recognizer 130 includes a parking space recognizer 132 (a first recognizer) and a surrounding vehicle recognizer 134 (a second recognizer) that are activated in a self-propelled parking event which will be described below. Details of functions of the parking space recognizer 132 and the surrounding vehicle recognizer 134 will be described below.

In principle, the action plan generator 140 travels on a recommended lane determined by the recommended lane determiner 61, and furthermore, generates a target trajectory in which the host vehicle M will automatically (independent of a driver's operation) travel in the future to cope with a surrounding situation of the host vehicle M. The target trajectory includes, for example, a speed element. For example, the target trajectory is expressed as a sequence in which points (trajectory points) to be reached by the host vehicle M are sequentially arranged. The trajectory points are points to be reached by the host vehicle M for each predetermined traveling distance (for example, about several [m]) in a road distance, and, separately from this, a target speed and a target acceleration for each predetermined sampling time (for example, about a decimal number [sec]) are generated as a part of the target trajectory. The trajectory point may be a position to be reached by the host vehicle M at a corresponding sampling time for each predetermined sampling time. In this case, information on the target speed and the target acceleration is expressed by an interval between the trajectory points.

The action plan generator 140 may set an event of automated driving in the generation of a target trajectory. The event of automated driving includes a constant speed traveling event, a low speed following traveling event, a lane change event, a branch event, a merge event, a takeover event, a self-propelled parking event in which a vehicle travels and parks by itself in valet parking or the like, a self-propelled pick-up event in which a vehicle travels and exits from a parking lot by itself, and travels to a predetermined boarding position by itself in valet parking or the like, and the like. The action plan generator 140 generates a target trajectory according to an activated event. The action plan generator 140 includes, for example, an autonomous parking controller 142 that is activated when a self-propelled parking event is executed, a requester 144 (a first requester), an acquirer 146, and a calculator 148. Details of functions of the autonomous parking controller 142, the requester 144, the acquirer 146, and the calculator 148 will be described below.

The second controller 160 controls the traveling drive force output device 200, the brake device 210, and the steering device 220 such that the host vehicle M passes through the target trajectory generated by the action plan generator 140 at a scheduled time.

The second controller 160 includes, for example, an acquirer 162, a speed controller 164, and a steering controller 166. The acquirer 162 acquires information on the target trajectory (trajectory points) generated by the action plan generator 140, and stores it in a memory (not shown). The speed controller 164 controls the traveling drive force output device 200 or the brake device 210 on the basis of a speed element associated with the target trajectory stored in the memory. The steering controller 166 controls the steering device 220 in accordance with a degree of bending of the target trajectory stored in the memory. Processing of the speed controller 164 and the steering controller 166 is realized by, for example, a combination of feed forward control and feedback control. As an example, the steering controller 166 executes a combination of the feed forward control in accordance with curvature of a road in front of the host vehicle M and the feedback control based on a deviation from the target trajectory.

The traveling drive force output device 200 outputs a traveling drive force (torque) for a traveling of a vehicle to drive wheels. The traveling drive force output device 200 includes, for example, a combination of an internal combustion engine, an electric motor, a transmission, and the like, and an electronic control unit (ECU) that controls these. The ECU controls the constituents described above according to information input from the second controller 160 or information input from the driving operator 80.

The brake device 210 includes, for example, a brake caliper, a cylinder that transmits a hydraulic pressure to the brake caliper, an electric motor that generates a hydraulic pressure to the cylinder, and a brake ECU. The brake ECU controls the electric motor according to the information input from the second controller 160 or the information input from the driving operator 80 such that a brake torque corresponding to a braking operation is output to each wheel. The brake device 210 may include, as a backup, a mechanism that transmits the hydraulic pressure generated by an operation of the brake pedal included in the driving operator 80 to the cylinder via a master cylinder. The brake device 210 is not limited to the configuration described above, and may be an electronically controlled hydraulic brake device that controls an actuator according to the information input from the second controller 160 and transmits the hydraulic pressure of the master cylinder to the cylinder.

The steering device 220 includes, for example, a steering ECU and an electric motor. The electric motor changes a direction of the steering wheel by, for example, applying a force to a rack and pinion mechanism. The steering ECU drives the electric motor and changes the direction of the steering wheel according to the information input from the second controller 160 or the information input from the driving operator 80.

[Self-Propelled Parking Event-at the Time of Entry]

Figure 3:
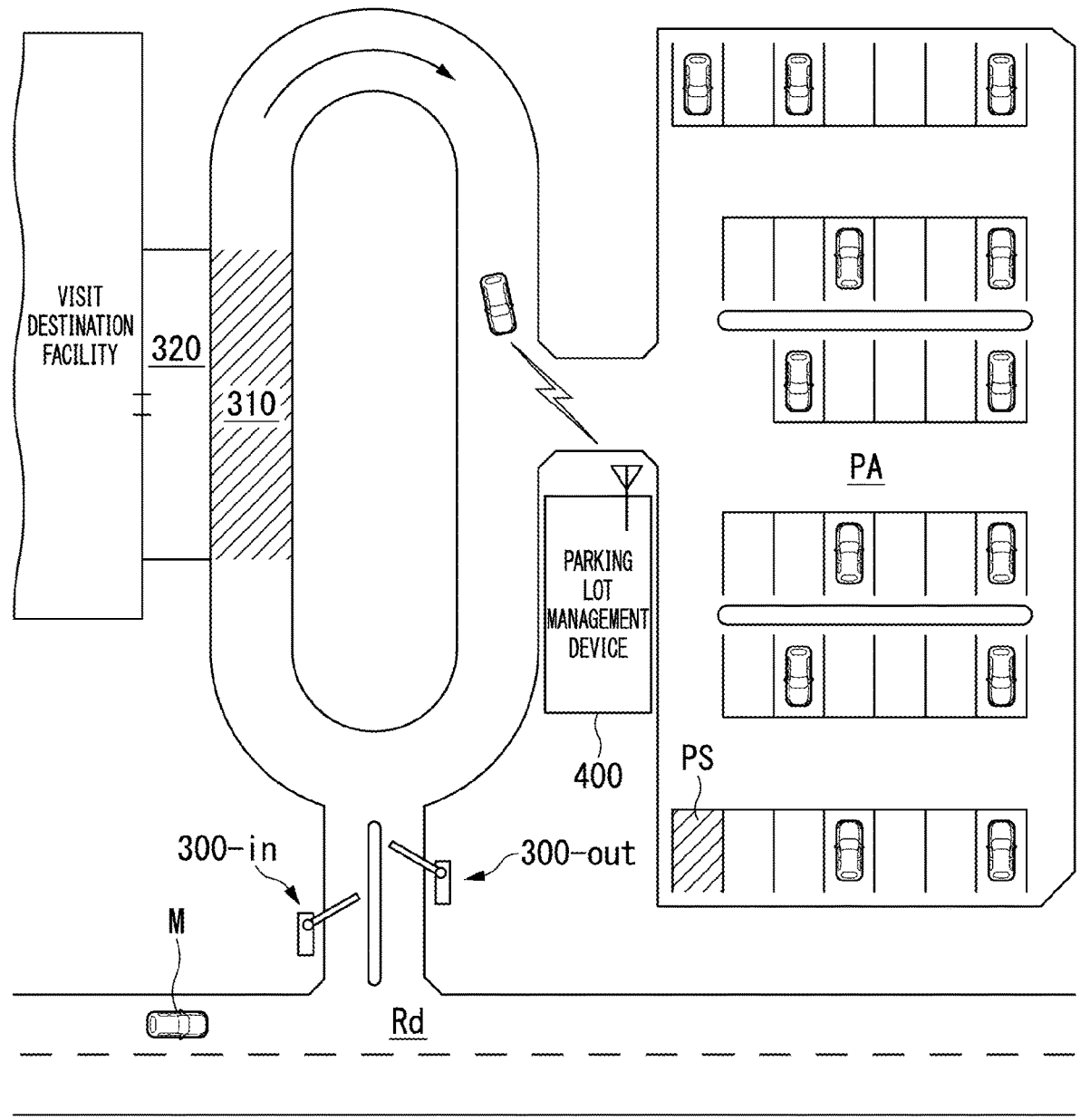
FIG. 3 is a diagram which schematically shows a scene in which a self-propelled parking event according to the embodiment is executed.

The autonomous parking controller 142 causes the host vehicle M to park in a parking space (a parking frame) on the basis of, for example, information acquired from the parking lot management device 400 by the communication device 20. FIG. 3 is a diagram which schematically shows a scene in which a self-propelled parking event according to the embodiment is executed. In a route from a road Rd to a visit destination facility, gates 300-in and 300-out are provided. The host vehicle M proceeds to a stopping area 310 by passing through the gate 300-in by manual driving or automated driving. The stopping area 310 faces a getting-on/off area 320 connected to the visit destination facility. The getting-on/off area 320 may be provided with an eave for avoiding rain or snow.

The host vehicle M starts a self-propelled parking event in which it performs automated driving after the occupant is dropped off at the stopping area 310 and moves to a parking space PS in a parking lot PA. A start trigger of the self-propelled parking event may be, for example, a certain operation by the occupant, or a reception of a predetermined signal wirelessly from the parking lot management device 400. When a self-propelled parking event is started, the autonomous parking controller 142 controls the communication device 20 such that a parking request is transmitted to the parking lot management device 400. Then, the host vehicle M moves from the stopping area 310 to the parking lot PA according to guidance by the parking lot management device 400 or while sensing by itself.

Figure 4:
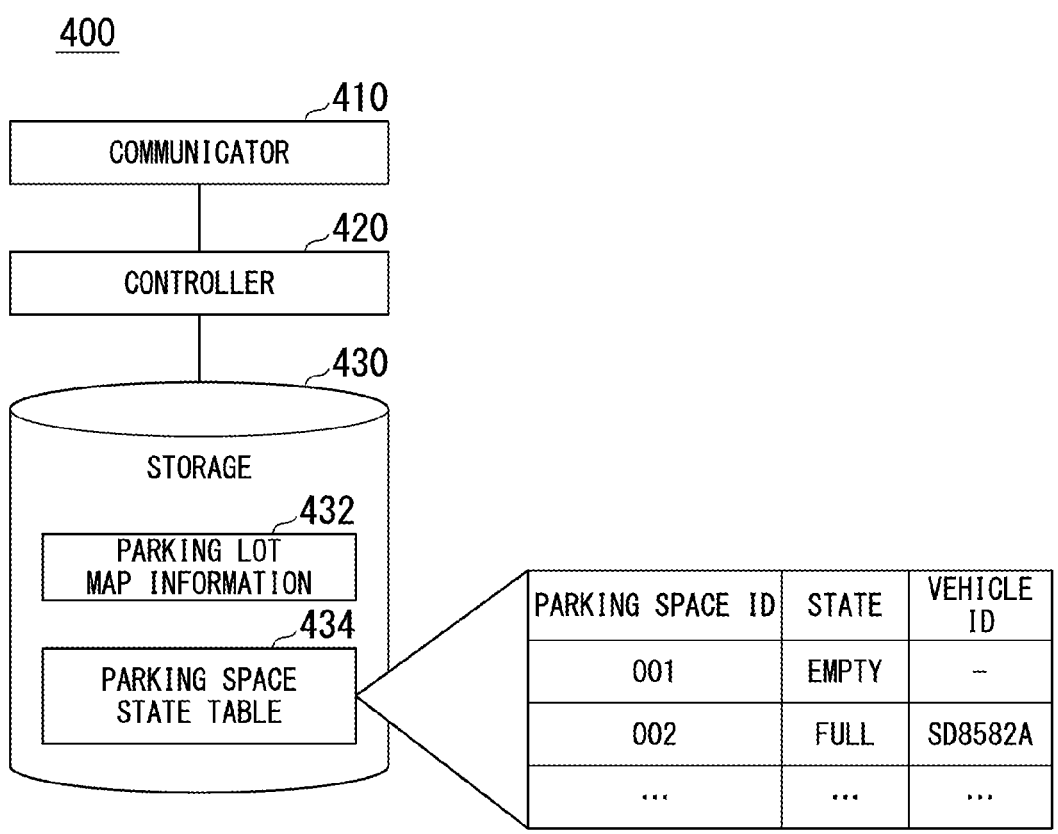
FIG. 4 is a diagram which shows an example of a configuration of a parking lot management device according to the embodiment.

FIG. 4 is a diagram which shows an example of a configuration of the parking lot management device 400 according to the embodiment. The parking lot management device 400 includes, for example, a communicator 410, a controller 420, and a storage 430. The storage 430 stores parking lot map information 432 and information on a parking space state table 434 and the like.

The communicator 410 wirelessly communicates with the host vehicle M or other vehicles (other vehicle). The controller 420 guides a vehicle to the parking space PS on the basis of information acquired by the communicator 410 and information stored in the storage 430. The parking lot map information 432 is information in which a structure of the parking lot PA is geometrically represented. The parking lot map information 432 includes coordinates for each parking space PS. The parking space state table 434 is a table in which, for example, a state indicating whether a parking space is empty or full (parking) and a vehicle ID that is identification information of a parking vehicle when the parking space is full are associated with a parking space ID that is identification information of the parking space PS.

If the communicator 410 receives a parking request from a vehicle, the controller 420 extracts the parking space PS which is in the empty state with reference to the parking space state table 434, acquires a position of the extracted parking space PS from the parking lot map information 432, and transmits a preferred route to the position of the acquired parking space PS to the vehicle using the communicator 410. The controller 420 instructs a specific vehicle to stop, slow down, or the like when necessary on the basis of a positional relationship between a plurality of vehicles such that the vehicles may not proceed to the same position at the same time.

In the vehicle (hereinafter, it is assumed to be the host vehicle M) which has received the route, the autonomous parking controller 142 generates a target trajectory based on the route. If a target parking space PS is approached, the parking space recognizer 132 recognizes a parking frame line and the like that define the parking space PS and recognizes a detailed position of the parking space PS to provide it to the autonomous parking controller 142. The autonomous parking controller 142 receives this, corrects the target trajectory, and allows the host vehicle M to park in the parking space PS.

[Self-Propelled Pick-Up Event-at the Time of Exit]

The autonomous parking controller 142 and the communication device 20 maintain an operation state even while the host vehicle M parks. The autonomous parking controller 142 causes a system of the host vehicle M to be activated and causes the host vehicle M to move to the stopping area 310, for example, when the communication device 20 receives a pick-up request from a terminal device owned by the occupant. At this time, the autonomous parking controller 142 controls the communication device 20 and transmits a departure request to the parking lot management device 400. The controller 420 of the parking lot management device 400, like at the time of entry, instructs a specific vehicle to stop, slow down, or the like when necessary on the basis of the positional relationship of a plurality of vehicles such that the vehicles may not proceed to the same position at the same time. If the host vehicle M is caused to move to the stopping area 310 and the occupant is allowed to board, the autonomous parking controller 142 stops operating, and, thereafter, manual driving, or automated driving by another functional unit is started.

Not being limited to the description as above, the autonomous parking controller 142 may find out an available parking space by itself on the basis of a result of detection by the camera 10, the radar device 12, the finder 14, or the object recognition device 16 without depending on communications, and allow the host vehicle M to park in the found-out parking space.

[Self-Propelled Parking Event-Operation Flow at the Time of Entry]

Figure 5:
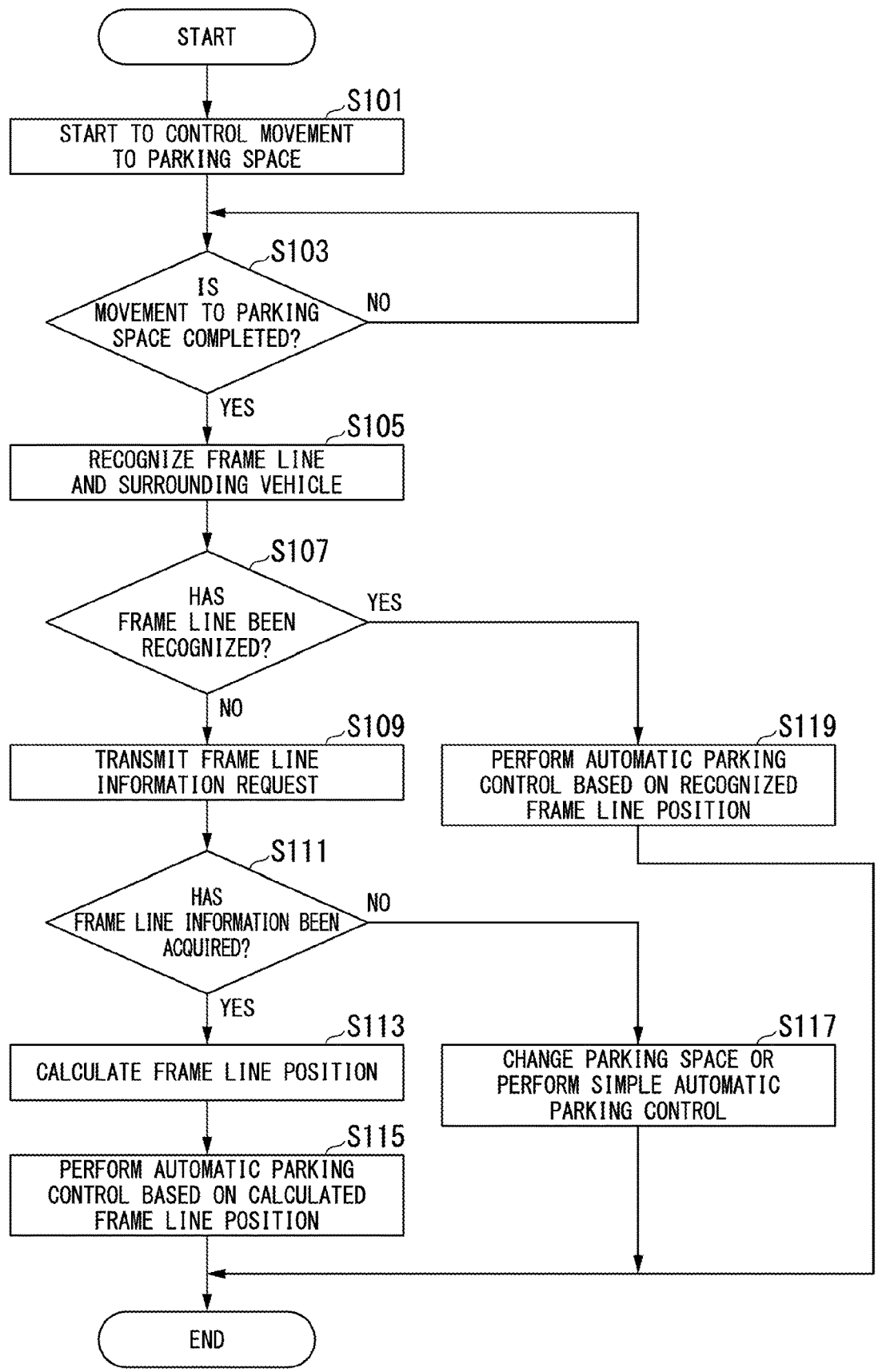
FIG. 5 is a diagram which shows an example of an operation flow of a self-propelled parking event of the automated driving control device according to the embodiment at the time of an entry.

An operation of a self-propelled parking event at the time of an entry as described above will be described. FIG. 5 is a diagram which shows an example of an operation flow of a self-propelled parking event of the automated driving control device 100 according to the embodiment at the time of an entry. The operation flow shown in FIG. 5, for example, is started when the parking lot management device 400 receives a parking request transmitted from the host vehicle M, determines a parking space PS on the basis of the information of the parking space state table 434 stored in the storage 430, and transmits information on a preferred route to a position of the determined parking space PS to the host vehicle M, and the host vehicle M receives the information on this route.

First, the autonomous parking controller 142 of the automated driving control device 100 starts movement control of the host vehicle M to the parking space PS based on the route information received from the parking lot management device 400 (step S101).

Next, the autonomous parking controller 142 determines whether the host vehicle M has completed movement to the parking space PS (a position at which a parking operation into a parking frame of the parking space PS can be started) on the basis of the route information received from the parking lot management device 400 and identification information of the parking space provided in the vicinity of the parking space (for example, an identification code provided on a passage around the parking frame of the parking space) (step S103). The autonomous parking controller 142 may determine whether the host vehicle M has completed the movement to the parking space PS on the basis of the route information received from the parking lot management device 400 and positional information of the host vehicle M input from the navigation device 50.

The autonomous parking controller 142 continues the same determination when it has determined that the host vehicle M has not completed the movement to the parking space PS. On the other hand, when the autonomous parking controller 142 has determined that the host vehicle M has completed the movement to the parking space PS, the parking space recognizer 132 starts recognition processing of a frame line of a parking frame defining the parking space PS, and, at the same time, the surrounding vehicle recognizer 134 starts recognition processing of a surrounding vehicle (other vehicle) stopped at a parking space adjacent to the parking space PS in which the host vehicle M automatically parks (step S105). This recognition processing performed by the parking space recognizer 132 and the surrounding vehicle recognizer 134 may be stopped within a parking frame of the host vehicle M and be continued until the parking operation is completed.

The parking space recognizer 132 performs the recognition processing of a frame line of a parking frame defining the parking space PS on the basis of information input from the camera 10, the radar device 12, and the finder 14 via the object recognition device 16. The surrounding vehicle recognizer 134 performs the recognition processing of a vehicle stopped at a parking space adjacent to the parking space PS on the basis of the information input from the camera 10, the radar device 12, and the finder 14 via the object recognition device 16.

Figure 6:
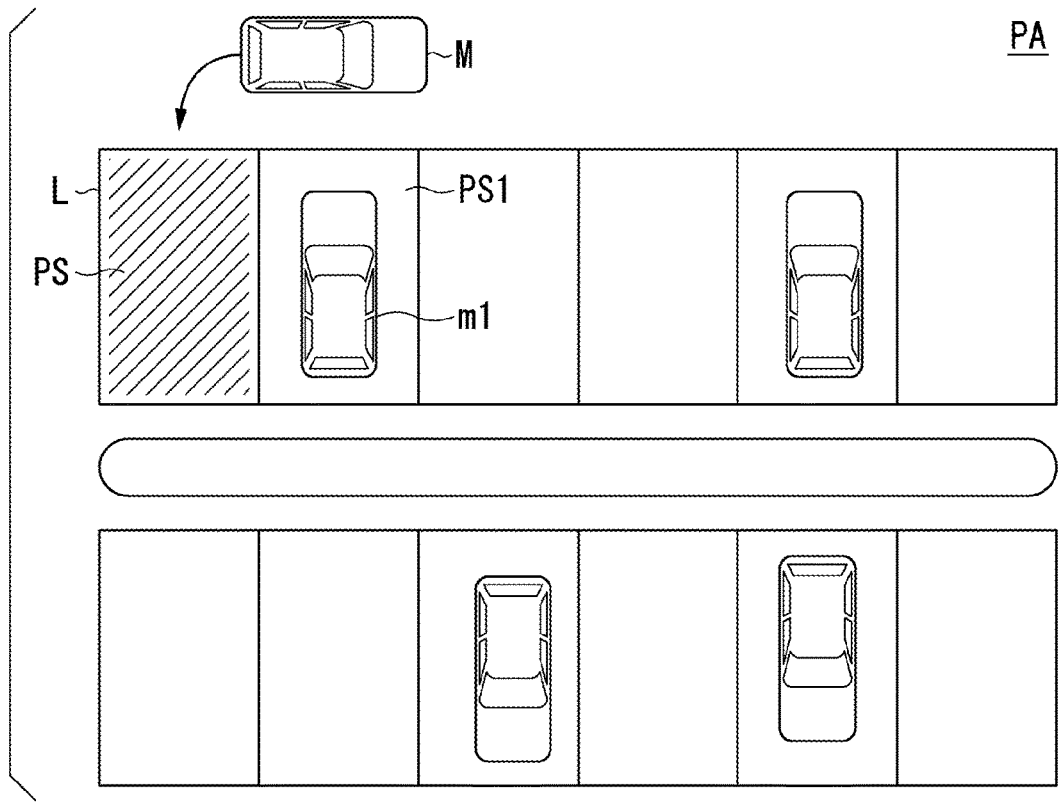
FIG. 6 is a diagram which shows a state in which a host vehicle according to the embodiment has completed movement to a parking space.

FIG. 6 is a diagram which shows a state in which the host vehicle M according to the embodiment has completed the movement to the parking space PS. As shown in FIG. 6, the autonomous parking controller 142 starts automatic parking into a parking frame L defining the parking space PS when it is determined that the host vehicle M has completed the movement to the parking space PS. The parking space recognizer 132 performs the recognition processing of a frame line of the parking frame L defining the parking space PS. The surrounding vehicle recognizer 134 performs the recognition processing for other vehicles (for example, other vehicle m1) stopped at a parking space (for example, a parking space PS1) adjacent to the parking space PS.

Next, the parking space recognizer 132 determines whether the frame line of the parking frame L defining the parking space PS can be recognized (step S107). When an environment in the vicinity of the parking space is suitable for the recognition of the frame line (for example, when a brightness is sufficient such as when the weather is good during the day, when it is possible to distinguish the frame line from other portions without there being falling rain, snow, or the like), the parking space recognizer 132 can recognize the frame line of the parking frame L on the basis of information on an image captured by the camera 10, and the like. When it is determined that the frame line of the parking frame L is recognized by the parking space recognizer 132, the autonomous parking controller 142 performs automatic parking control to cause the host vehicle M to move into the parking frame L on the basis of the positional information of this recognized frame line of the parking frame L (step S119). As a result, the automatic parking of the host vehicle M into the parking frame L is completed, and processing of this flowchart ends.

On the other hand, when the environment in the vicinity of the parking space is not suitable for the recognition of a frame line (for example, when a brightness is not sufficient such as after sunset, in bad weather, at the time of parking in an indoor parking lot, or the like, and it is not possible to distinguish the frame line from other portions, or the like), a boundary (a luminance difference) between the parking frame L and other portions in the image captured by the camera 10 may not be clear, and the parking space recognizer 132 may not be able to recognize the frame line of the parking frame L. Even if the brightness in the vicinity of the parking space is sufficient, the boundary between the parking frame L and other portions in the image captured by the camera 10 may not be clear due to effects of backlight, and the parking space recognizer 132 may not be able to recognize the frame line of the parking frame L. As described above, when it is determined that the parking frame L is not recognized by the parking space recognizer 132, the requester 144 transmits a frame line information request for requesting frame line information to other vehicle stopped at a parking space adjacent to the parking space PS recognized by the surrounding vehicle recognizer 134 (step S109).

Figure 7:
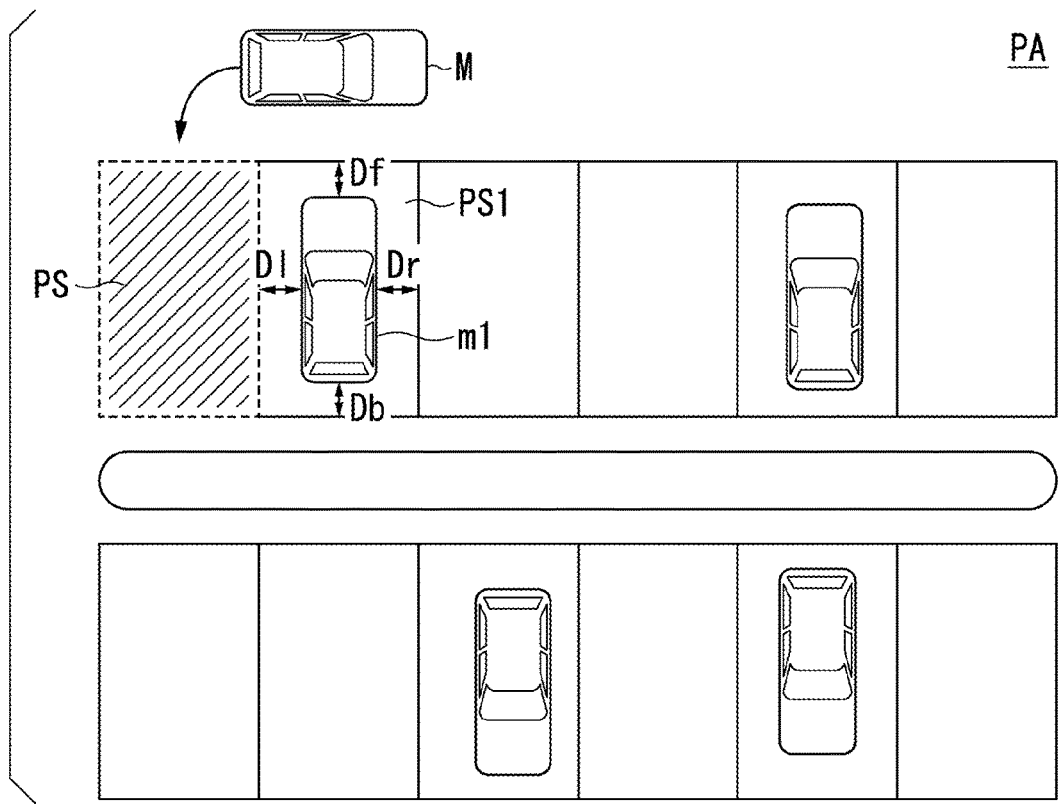
FIG. 7 is a diagram which describes frame line information according to the embodiment.

"Frame line information" is information indicating a position of the frame line of the parking frame L. For example, the frame line information indicates a distance between a stop position of a vehicle and the position of the frame line of the parking frame L. The frame line information is stored in a storage device (not shown) mounted in the vehicle. FIG. 7 is a diagram which describes frame line information according to the embodiment. As shown in FIG. 7, the frame line information includes information indicating a distance (a front margin distance Df) between the stop position of a vehicle (for example, a front end of a stopped vehicle) and the position of the frame line of the parking frame L positioned in front of the vehicle, a distance (a right margin distance Dr) between the stop position of a vehicle (for example, a right end of a stopped vehicle) and the position of the frame line of the parking frame L positioned to the right of the vehicle, a distance (a left margin distance Dl) between the stop position of a vehicle (for example, a left end of a stopped vehicle) and the position of the frame line of the parking frame L positioned to the left of the vehicle, and a distance (a back margin distance Db) between the stop position of a vehicle (for example, a rear end of a stopped vehicle) and the position of a parking frame line positioned behind the vehicle.

FIG. 8 is a diagram which shows an example of the frame line information MD according to the embodiment. As shown in FIG. 8, the frame line information MD includes the front margin distance Df, the right margin distance Dr, the left margin distance Dl, and the back margin distance Db in association with information for identifying a parking space with a stopped vehicle therein, and is stored in a storage device. The requester 144 of the host vehicle M transmits a frame line information request for requesting the frame line information MD to the other vehicle m1 stopped at the parking space PS1 adjacent to the parking space PS. In response to this frame line information request, the other vehicle m1 transmits the frame line information MD stored in the storage device mounted in the other vehicle to the host vehicle M. The frame line information MD may be frame line information calculated on the basis of an image captured by a camera (sensor) mounted in the other vehicle m1 when the other vehicle m1 has performed automatic parking, and stored in the storage device, or may also be frame line information calculated on the basis of the image captured by the camera of the other vehicle m1 activated when a frame line information request is received from the host vehicle M.

Next, the acquirer 146 of the host vehicle M determines whether the frame line information MD has been acquired from the other vehicle m1 (step S111). When it is determined that the frame line information MD has been acquired by the acquirer 146, the calculator 148 calculates the position of the frame line of the parking frame L on the basis of the frame line information MD and positional information of the other vehicle m1 recognized by the surrounding vehicle recognizer 134 (step S113).

Figure 9:
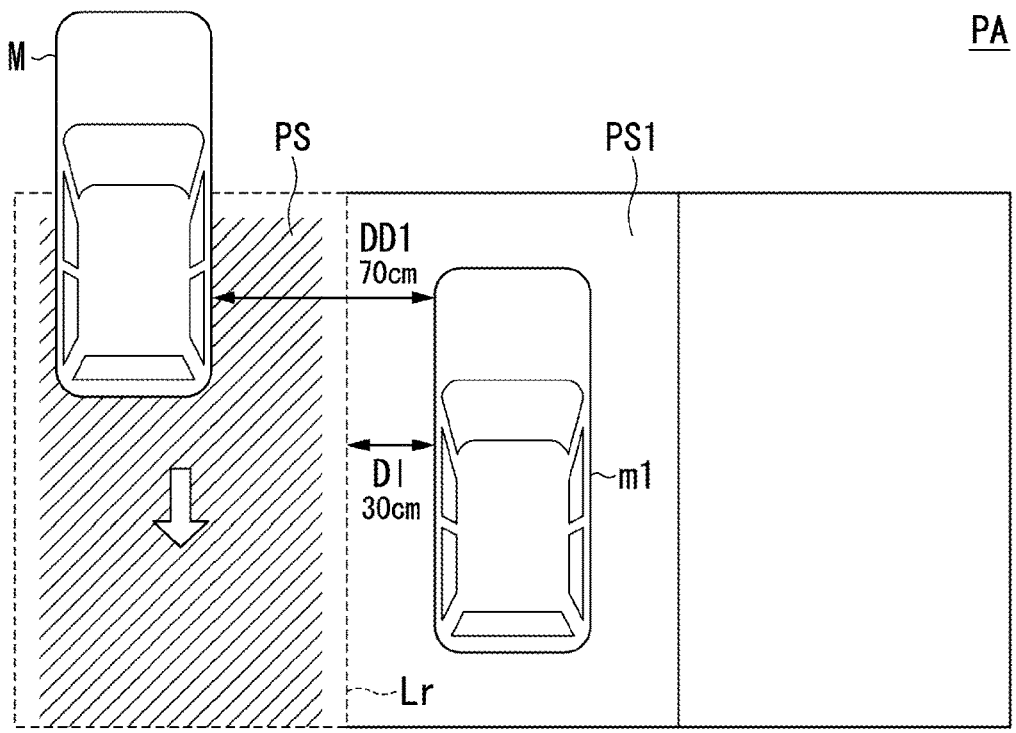
FIG. 9 is a diagram which describes an example of calculation processing of a position of a frame line of a parking frame using a calculator according to the embodiment.

FIG. 9 is a diagram which describes an example of calculation processing of the position of the frame line of the parking frame L using a calculator 148 according to the embodiment. In the example shown in FIG. 9, a case is shown in which the left margin distance Dl of the other vehicle m1 is 30 cm, and a distance DD1 between the right end of the host vehicle M and the left end of the other vehicle m1, calculated on the basis of the positional information of the other vehicle m1 recognized by the surrounding vehicle recognizer 134, is 70 cm. In this case, the calculator 148 calculates a position of a frame line Lr (a frame line defining between the parking space PS and the parking space PS1 among two frame lines of the parking frame L in the length direction) as a position obtained by subtracting the left margin distance Dl of the other vehicle m1 (30 cm) from the distance DD1 (70 cm) (that is, a position 40 cm away from the right end of the host vehicle M). In this example, the frame line Lr configures part of the frame line of the parking frame L of the parking space PS and also configures part of the frame line of the parking frame of the parking space PS1.

Figure 10:
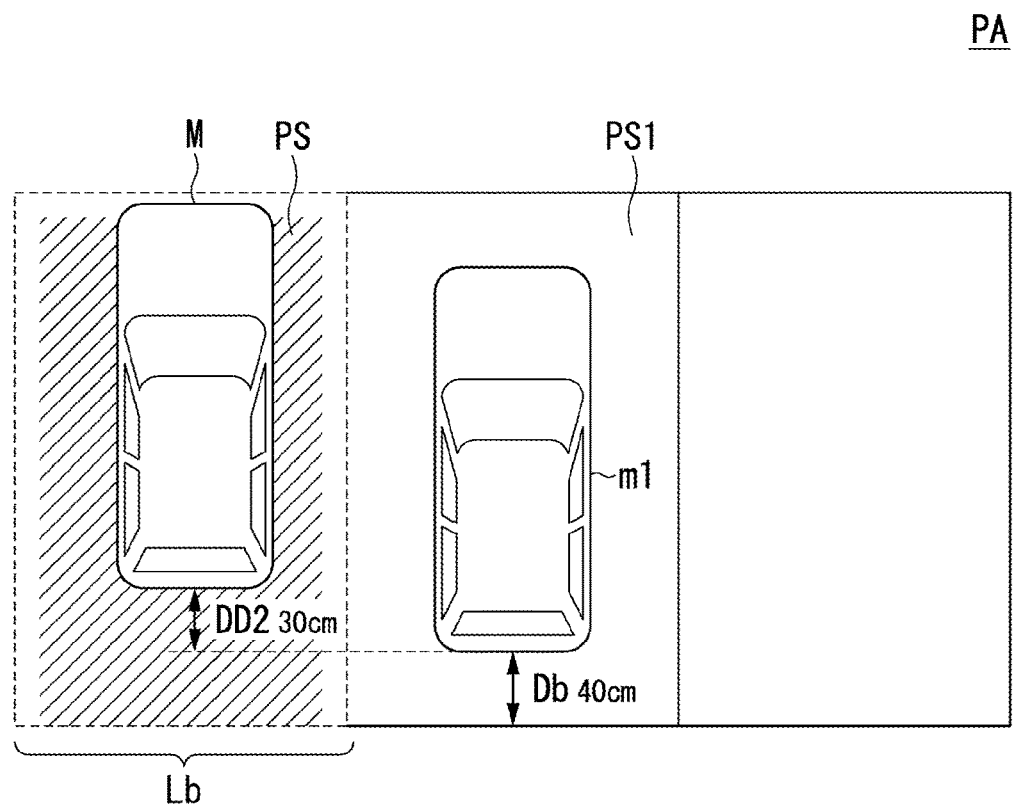
FIG. 10 is a diagram which describes another example of the calculation processing of a position of a frame line of a parking frame using the calculator according to the embodiment.

FIG. 10 is a diagram which describes another example of the calculation processing of the position of the frame line of the parking frame L using the calculator 148 according to the embodiment. In the example shown in FIG. 10, a case is shown in which the back margin distance Db of the other vehicle m1 is 40 cm, and a distance DD2 between the rear end of the host vehicle M and the rear end of the other vehicle m1, which is calculated on the basis of the positional information of the other vehicle m1 recognized by the surrounding vehicle recognizer 134, is 30 cm. In this case, the calculator 148 calculates a position of a frame line Lb (a line defining an end of the parking space PS among two frame lines of the parking frame L in the width direction) as a position obtained by adding the distance DD2 (30 cm) to the back margin distance Db (40 cm) of the other vehicle m1 (that is, a position away from the rear end of the host vehicle M by 70 cm).

Figure 11:
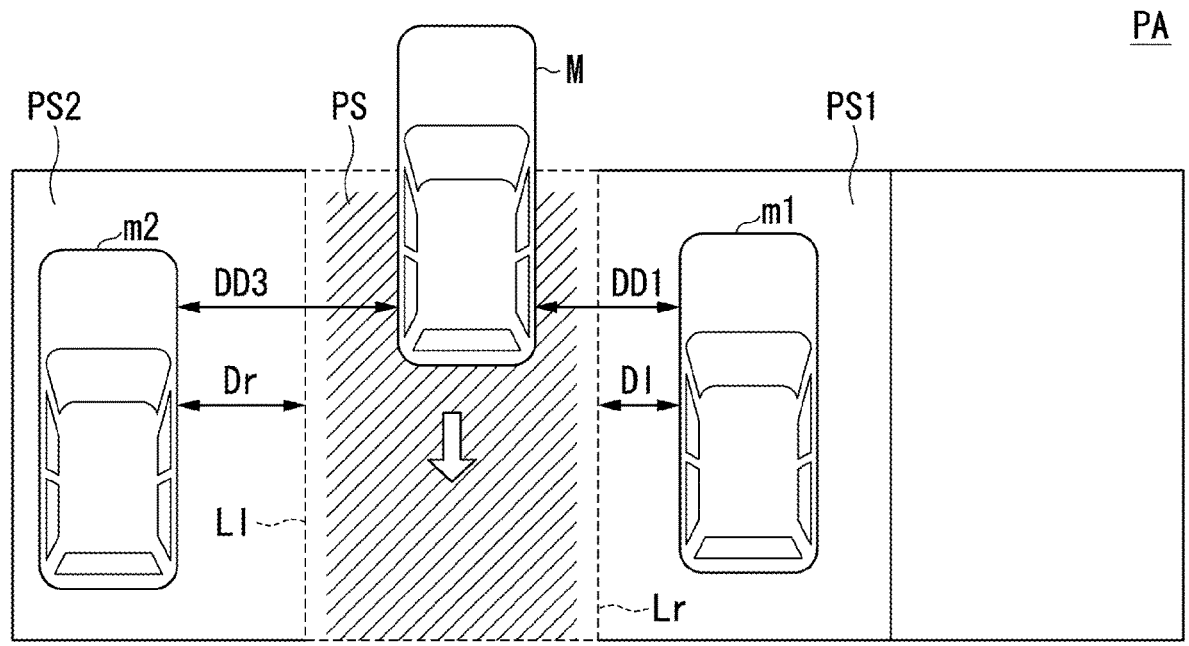
FIG. 11 is a diagram which describes another example of the calculation processing of a position of a frame line of a parking frame using the calculator according to the embodiment.

FIG. 11 is a diagram which describes another example of the calculation processing of the position of the frame line of the parking frame L using the calculator 148 according to the embodiment. In the example shown in FIG. 11, a case is shown in which other vehicles (other vehicle m1 and other vehicle m2) are stopped at both the parking space PS1 and the parking space PS2 on both sides of the parking space PS in which the host vehicle M automatically parks. In this case, the calculator 148 calculates the position of the frame line Lr on the basis of the frame line information MD acquired from the other vehicle m1 stopped at the parking space PS1 and positional information of the other vehicle m1 recognized by the surrounding vehicle recognizer 134. The calculator 148 calculates a position of a frame line Ll (a frame line defining between the parking space PS and the parking space PS2 among two frame lines of the parking frame L in the length direction) on the basis of the frame line information MD acquired from the other vehicle m2 stopped at the parking space PS2 and positional information of the other vehicle m2 recognized by the surrounding vehicle recognizer 134 (a distance DD3 between the left end of the host vehicle M and the right end of the other vehicle m2). The calculator 148 may calculate the position of the frame line Ll on the basis of a length of the parking space PS in the width direction and the calculated position of the frame line Lr when information on the length of the parking space PS in the width direction is acquired in advance. The calculator 148 may calculate the position of the frame line Lr on the basis of the length of the parking space PS in the width direction and the calculated position of the frame line Ll.

Returning to FIG. 5, next, the autonomous parking controller 142 controls automatic parking on the basis of the position of the frame line of the parking frame L calculated by the calculator 148 (step S115). For example, in the example shown in FIG. 9, it is calculated that the frame line Lr is at a position away from the right end of the host vehicle M by 40 cm, and it is estimated that a center position of the host vehicle M in the vehicle width direction is slightly shifted in a leftward direction from a center position of the parking space PS in the width direction. In this case, the autonomous parking controller 142 controls automatic parking such that the center position of the host vehicle M in the vehicle width direction approaches the center position of the parking space PS in the width direction. As a result, the host vehicle M can be stopped at an appropriate position in the parking frame L.

On the other hand, when communication between the host vehicle M and another vehicle is not properly performed, when another vehicle is not storing the frame line information MD, or the like, the acquirer 146 may not be able to acquire the frame line information MD from the other vehicle in some cases. Regarding when other vehicle not being able to recall the frame line information MD, there is a case in which the frame line of a parking frame cannot be recognized when the other vehicle performs automatic parking, and the like. As described above, when it is determined that the frame line information MD has not been acquired by the acquirer 146 (step S111), the autonomous parking controller 142 changes a parking space and controls automatic parking at a parking space after the change. In this case, the autonomous parking controller 142 transmits a request for requesting a change of a parking space to the parking lot management device 400, acquires information on a parking space after the change from the parking lot management device 400, and controls automatic parking at the parking space after the change. Alternatively, when it is determined that the frame line information MD has not been acquired by the acquirer 146 (step S111), the autonomous parking controller 142 performs automatic parking control (simple automatic parking control) such that the center position of the host vehicle M in the vehicle width direction overlaps the center position of the parking space PS in the width direction (step S117). In this case, the center position of the vehicle M in the vehicle width direction and the center position of the parking space PS in the width direction do not need to be completely matched, and a difference between these two positions only needs to be within a predetermined threshold. As described above, processing of this flowchart ends.

In the above-described embodiment, an example in which the calculator 148 mounted in the host vehicle M calculates the position of the frame line of the parking frame L on the basis of the frame line information MD acquired from other vehicle and the positional information of the other vehicle recognized by the surrounding vehicle recognizer 134 mounted in the host vehicle M has been described, but the present invention is not limited to thereto. For example, the calculator 148 may recognize the position of the host vehicle M on the other vehicle side and calculate the position of the frame line of the parking frame L on which the host vehicle M performs automatic parking (for example, a relative distance between the host vehicle M and the frame line of the parking frame L, or the like) on the basis of the recognized position of the host vehicle M and the frame line information MD stored in the other vehicle. The host vehicle M may acquire the position of the parking frame L calculated using the other vehicle and perform automatic parking control.

Figure 12:
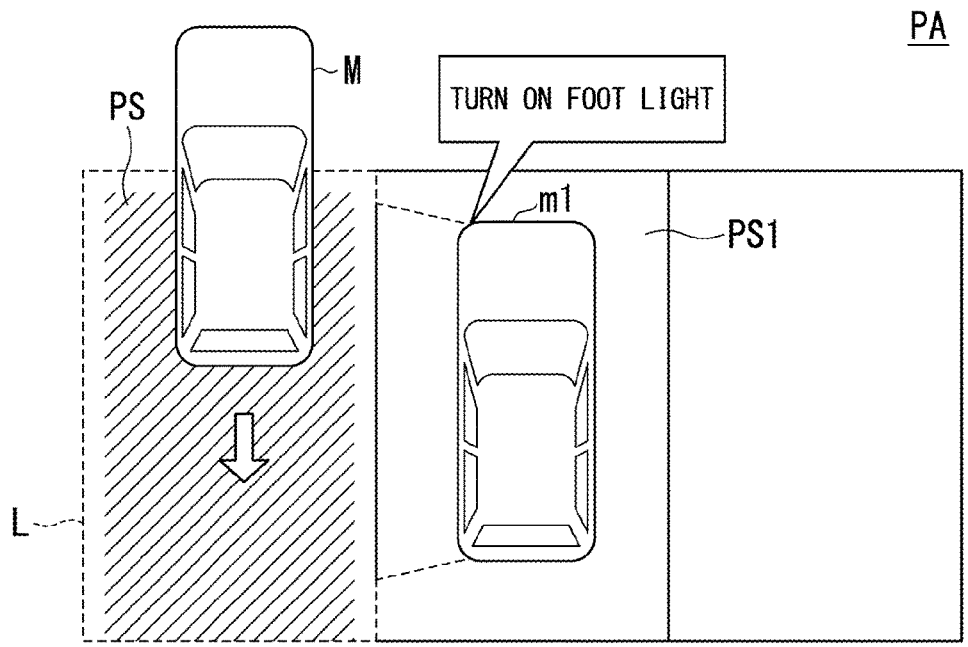
FIG. 12 is a diagram which shows a state in which a foot light illuminating a lower portion of other vehicle according to the embodiment is operated.

The automated driving control device 100 of the host vehicle M may further include a requester (a second requester) that transmits a request for requesting operating (turning on) a light (a foot light illuminating a foot on the parking space PS side) illuminating a lower portion of other vehicle to the other vehicle stopped at a parking space adjacent to the parking space PS. FIG. 12 is a diagram which shows a state in which a foot light illuminating the lower portion of other vehicle according to the embodiment is operated. As a result, the parking space recognizer 132 of the host vehicle M may recognize the frame line of the parking frame L.

The host vehicle M may transmit the frame line information MD acquired from the other vehicle to the parking lot management device 400. The parking lot management device 400 may select a vehicle to guide to a parking frame on the basis of the received frame line information MD. For example, the parking lot management device 400 may perform control so as to guide a small vehicle to a parking space that is determined to have a narrow parking-available space on the basis of the frame line information MD, and to guide a large vehicle to a parking space that is determined to have a wide parking-available space.

Figure 13:
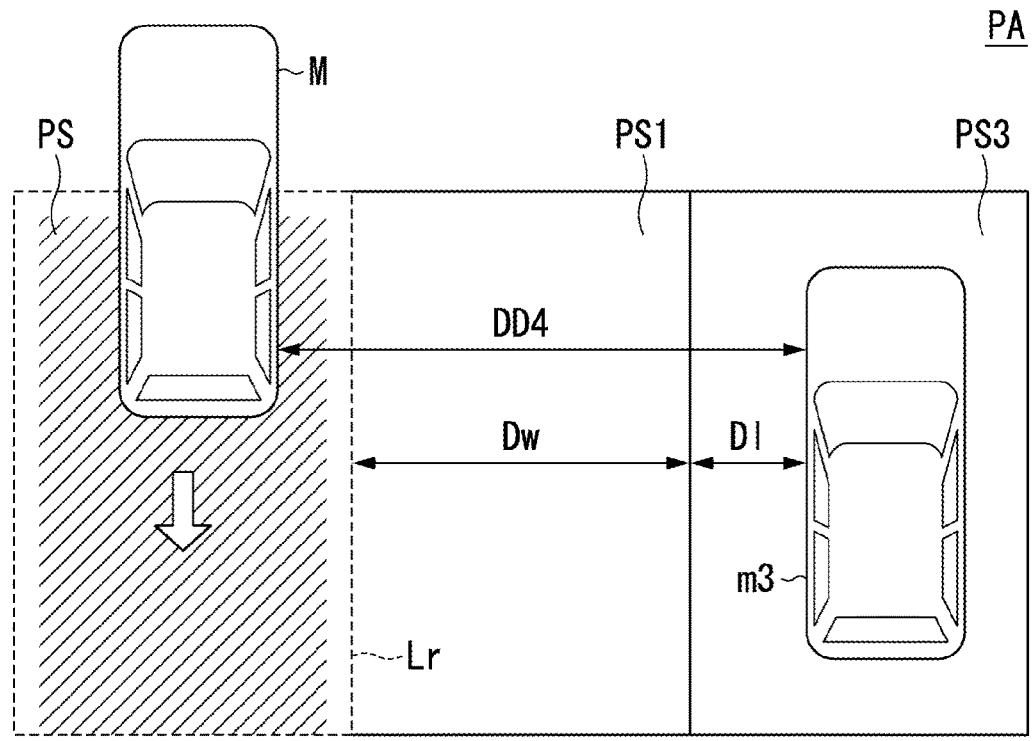
FIG. 13 is a diagram which describes another example of a positional relationship between the host vehicle and other vehicle according to the embodiment.

In the embodiment described above, an example is shown in which the host vehicle M acquires frame line information MD from other vehicle stopped in a parking space adjacent to the parking space PS in which the host vehicle M automatically parks, but the present invention is not limited thereto. For example, as shown in FIG. 13, the frame line information MD may also be acquired from the other vehicle m3 stopped in a parking space PS3 adjacent to the parking space PS1 instead of other vehicle stopped in the parking space PS1 adjacent to the parking space PS. That is, in the present specification, the parking space adjacent to the parking space PS may also include not only the parking space adjacent to (immediately adjacent to) the parking space PS but also one or more parking spaces between these two.

In this case, the calculator 148 may add the frame line information MD width direction acquired in advance and calculate the position of the frame line Lr on the (the left margin distance Dl in the example of FIG. 13) acquired from the other vehicle m3 stopped in the parking space PS3 and a length Dw of the parking space PS1 in the basis of this added value and positional information of the other vehicle m3 recognized by the surrounding vehicle recognizer 134 (a distance DD4 between the right end of the host vehicle M and the left end of the other vehicle m3). For example, the calculator 148 may calculate the position of the frame line Lr by subtracting the added value described above from DD4.

According to the embodiment described above, it is possible to perform accurate parking control even when a parking frame cannot be recognized in automatic parking processing of automatic valet parking.

[Hardware Configuration]

Figure 14:
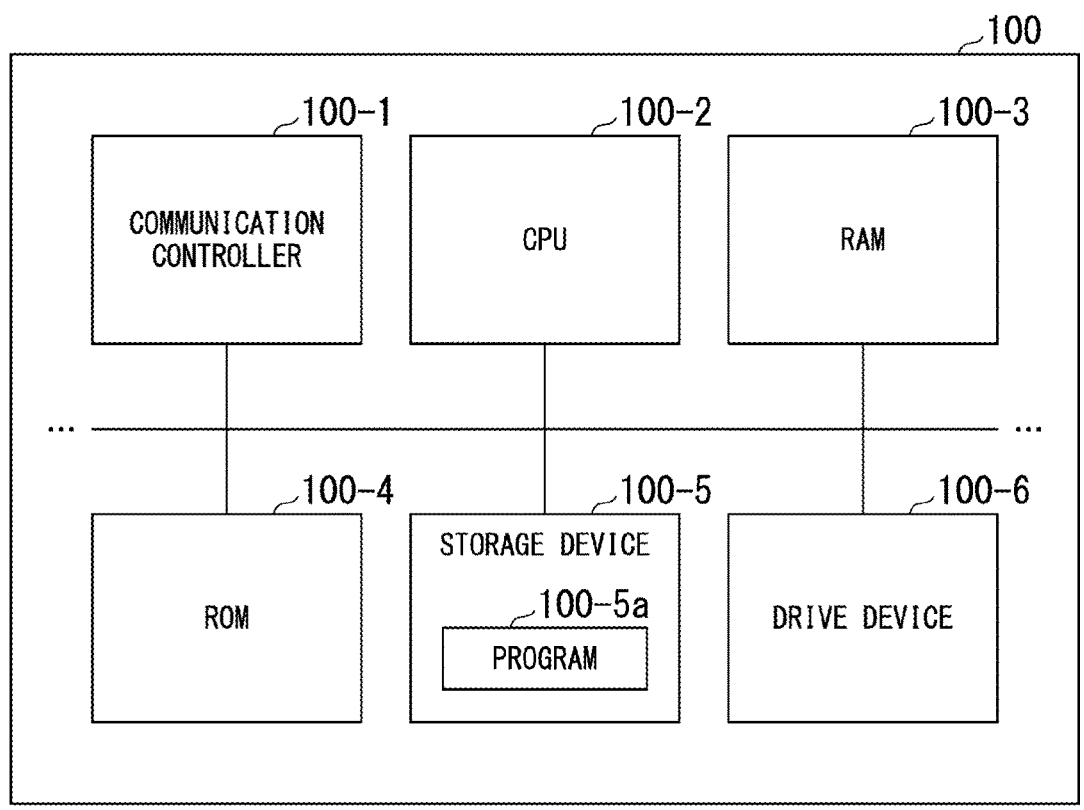
FIG. 14 is a diagram which shows an example of a hardware configuration of the automated driving control device according to the embodiment.

FIG. 14 is a diagram which shows an example of a hardware configuration of the automated driving control device 100 according to the embodiment. As shown in FIG. 14, the automated driving control device 100 (computer) is configured to include a communication controller 100-1, a CPU 100-2, a random access memory (RAM) 100-3 used as a working memory, a read only memory (ROM) 100-4 that stores a booting program and the like, a storage device 100-5 such as a flash memory or a hard disk drive (HDD), a drive device 100-6, and the like being connected to each other by an internal bus or a dedicated communication line. The communication controller 100-1 communicates with components other than the automated driving control device 100. The storage device 100-5 stores a program 100-5a executed by the CPU 100-2. This program is expanded in the RAM 100-3 by a direct memory access (DMA) controller (not shown) or the like and executed by the CPU 100-2. As a result, some or all of the first controller 120 and the second controller 160 are realized.

The embodiment described above can be expressed as follows.

A vehicle control device is a vehicle control device that is mountable in a vehicle including a storage device storing a program and a hardware processor and is configured to acquire positional information of a frame line of a second parking frame from other vehicle stopped at the second parking frame adjacent to a first parking frame at which the vehicle automatically parks and to calculate a position of a frame line of the first parking frame on the basis of the acquired positional information of the frame line of the second parking frame by the hardware processor executing the program stored in the storage device.

A mode for implementing the present invention has been described using the embodiment. However, the present invention is not limited to such an embodiment, and various modifications and substitutions may be made within a range not departing from the gist of the present invention.

What is claimed is:

1. A vehicle control device mountable in a vehicle, the vehicle control device comprising a processor configured to execute a program to:
perform a process for acquiring positional information of a frame line of a second parking frame from an other vehicle stopped at the second parking frame adjacent to a first parking frame at which the vehicle automatically parks, among a plurality of parking frames that define parking spaces for each vehicle provided in a parking lot, the positional information of the frame line of the second parking frame being measured by a sensor of the other vehicle;
calculate a position of a frame line of the first parking frame on the basis of the acquired positional information of the frame line of the second parking frame in a case where the positional information of the frame line of the second parking frame was acquired from the other vehicle; and
control automatic parking of the vehicle at the first parking frame on the basis of the calculated position of the frame line of the first parking frame,
wherein the processor is further configured to execute the program to:
perform a process for recognizing the frame line of the first parking frame; and
based on the frame line of the first parking frame not being recognized during the process for recognizing, transmit a request for the positional information of the frame line of the second parking frame to the other vehicle.

2. The vehicle control device according to claim 1,
wherein the processor is configured to execute the program to acquire the positional information of the frame line of the second parking frame measured by the sensor of the other vehicle activated on the basis of the request.

3. The vehicle control device according to claim 1, wherein the processor is configured to execute the program to:
recognize a position of the other vehicle;
acquire information indicating a distance between the other vehicle and the frame line of the second parking frame from the other vehicle; and
calculate the position of the frame line of the first parking frame on the basis of the recognized position of the other vehicle and the acquired information indicating the distance between the other vehicle and the frame line of the second parking frame.

4. The vehicle control device according to claim 3,
wherein the processor is configured to execute the program to calculate the position of the frame line of the first parking frame by subtracting the distance between the other vehicle and the frame line of the second parking frame from a distance between a position of the vehicle and the recognized position of the other vehicle.

5. The vehicle control device according to claim 1,
wherein the processor is configured to execute the program to acquire positional information of the frame line of the first parking frame calculated on the basis of the positional information of the frame line of the second parking frame from the other vehicle.

6. The vehicle control device according to claim 1, wherein the processor is configured to execute the program to transmit a request for requesting an operation of a light illuminating a lower portion of the other vehicle to the other vehicle.

7. The vehicle control device according to claim 1,
wherein there is at least another parking frame between the first parking frame and the second parking frame.

8. The vehicle control device according to claim 1,
wherein the processor is configured to execute the program to change a parking frame at which the vehicle performs automatic parking in a case where the frame line of the first parking frame was not recognized and the positional information of the frame line of the second parking frame was not acquired from the other vehicle.

9. The vehicle control device according to claim 1
wherein the processor is configured to execute the program to control the automatic parking to make a center position in a vehicle width direction of the vehicle and a center position in a width direction of the first parking frame overlap each other in a case where the frame line of the first parking frame was not recognized and the positional information of the frame line of the second parking frame was not acquired from the other vehicle.

10. A vehicle management device that selects a vehicle to be guided to a first parking frame on the basis of positional information of a frame line of a second parking frame transmitted by a vehicle control device mountable in an other vehicle, the vehicle control device comprising a processor configured to execute a program to:
perform a process for acquiring the positional information of the frame line of the second parking frame from the other vehicle stopped at the second parking frame adjacent to the first parking frame, at which the vehicle automatically parks, among a plurality of parking frames that define parking spaces for each vehicle provided in a parking lot, the positional information of the frame line of the second parking frame being measured by a sensor of the other vehicle;
calculate a position of a frame line of the first parking frame on the basis of the acquired positional information of the frame line of the second parking frame in a case where the positional information of the frame line of the second parking frame was acquired from the other vehicle; and
control automatic parking of the vehicle at the first parking frame on the basis of the calculated position of the frame line of the first parking frame,
wherein the processor is further configured to execute the program to:
perform a process for recognizing the frame line of the first parking frame; and
based on the frame line of the first parking frame not being recognized during the process for recognizing, transmit a request for the positional information of the frame line of the second parking frame to the other vehicle.

11. A vehicle control method comprising:

by a computer of a vehicle control device mountable in a vehicle, acquiring positional information of a frame line of a second parking frame from an other vehicle stopped at the second parking frame adjacent to a first parking frame at which the vehicle automatically parks, among a plurality of parking frames that define parking spaces for each vehicle provided in a parking lot, the positional information of the frame line of the second parking frame being measured by a sensor of the other vehicle;

calculating a position of a frame line of the first parking frame on the basis of the acquired positional information of the frame line of the second parking frame; and controlling automatic parking of the vehicle at the first parking frame on the basis of the calculated position of the frame line of the first parking frame, the vehicle control method further comprising:

performing a process for recognizing the frame line of the first parking frame; and based on the frame line of the first parking frame not being recognized during the process for recognizing, transmitting a request for the positional information of the frame line of the second parking frame to the other vehicle.

12. A computer-readable non-transitory storage medium that stores a program causing a computer of a vehicle control device mountable in a vehicle to:

acquire positional information of a frame line of a second parking frame from an other vehicle stopped at the second parking frame adjacent to a first parking frame at which the vehicle automatically parks, among a plurality of parking frames that define parking spaces for each vehicle provided in a parking lot, the positional information of the frame line of the second parking frame being measured by a sensor of the other vehicle;

calculate a position of a frame line of the first parking frame on the basis of the acquired positional information of the frame line of the second parking frame; and control automatic parking of the vehicle at the first parking frame on the basis of the calculated position of the frame line of the first parking frame, wherein the program is further configured to cause the computer to:

perform a process for recognizing the frame line of the first parking frame; and based on the frame line of the first parking frame not being recognized during the process for recognizing, transmit a request for the positional information of the frame line of the second parking frame to the other vehicle.

\* \* \* \* \*